United States Patent [19]

Shirley, Jr. et al.

[11] Patent Number: 4,927,789

[45] Date of Patent: May 22, 1990

[54] RADIO PROGRAMMING DEVICE WITH ACCESS TO A REMOTE DATABASE

[75] Inventors: Thomas F. Shirley, Jr., Fort Worth; Eric S. Goldsmith, Watauga, both of Tex.

[73] Assignee: Motorola, Inc., Schaumburg, Ill.

[21] Appl. No.: 175,002

[22] Filed: Mar. 30, 1988

[51] Int. Cl.[5] ............................................. H04B 17/00
[52] U.S. Cl. ..................................... 455/67; 455/186; 455/226
[58] Field of Search .................. 455/186, 226, 67, 185

[56] References Cited

U.S. PATENT DOCUMENTS

| | | | |
|---|---|---|---|
| 4,310,924 | 1/1982 | Miyasaka et al. | 455/186 |
| 4,525,865 | 6/1985 | Mears | 455/186 |
| 4,739,486 | 4/1988 | Soderberg et al. | 364/464 |
| 4,771,399 | 9/1988 | Snowden et al. | 455/186 |
| 4,792,986 | 12/1988 | Garner et al. | 455/186 |

OTHER PUBLICATIONS

User Manual for the Motorola Trunking Code Management System Remote Field Programming Radio Unit Code Plugs, dated Jun. 1, 1986.
User Manual for the Motorola Trunking Code Management System Remote Field Programming Read/Display Radio Unit Code Plugs, dated July 1, 1986.
User Manual for the Motorola Trunking Code Management System Remote Field Programming Read/Display Radio Unit Code Plugs, dated November 1, 1986.
The MC Micro Field Programmer Handbook, dated 1985 by Motorola GmbH Taunusstein.
Systems 9000 Trunked Radio Programmer, dated 1986 by Motorola, Inc.
Systems 9000 Conventional Options Programmer 1985, Motorola, Inc.
Systems 9000 Conventional 64 Mode Radio and Control Head Programmer, dated, Nov. 12, 1985.
Systems 9000 Conventional 32 Mode Radio and Control Head Programmer, dated Nov. 12, 1985.
EEPROM Programmer (Instruction Manual No. 68P06088T60-0, published in 1984.
Users Manual for Programming the Mostar NVR (Manual No. 68P80100W88-0, published in 1985.
HT600 Programmer/Tuner User's Manual (Manual No. 68P81045C55-2.
SMARINET Standalone Field Programmer Model T5124A (Programming Information Guide 68P-811-17E11-0, published in 1985.
Systems 9000 Conventional Radio Programmer Operator's Manual (Manual No. 68-80309B24-0, published in 1986.
Systems 9000 Conventional Control Head Programmer Operator's Manual, (Manual No. 68-80309B25-0, dated May 15, 1986).
Systems 9000 Trunked Control Head Programmer Operator's Manual (Operator's Manual No. 68-80309B-26-0, dated May 15, 1986.

Primary Examiner—Joseph A. Orsino
Assistant Examiner—Frank M. Scutch, III
Attorney, Agent, or Firm—Steven G. Parmelee

[57] ABSTRACT

A programming station for use in programming and servicing two-way radios. The station allows a user to read stored radio control and radio feature parameters as stored in either a radio or an archive file. The station allows the user to modify at least some of the radio feature parameters, and to access a remote central unit that allows modification of the remaining radio feature parameters. The changed parameters can then be merged as necessary and stored in the radio and/or an archive file.

3 Claims, 4 Drawing Sheets

RADIO PROGRAMMING DEVICE WITH ACCESS TO A REMOTE DATABASE

COPYRIGHT INFORMATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates generally to the programming and servicing of two-way radios.

BACKGROUND ART

Two-way radios are becoming increasingly sophisticated. Many such radios now realize many operating functions and features through provision of an on-board microprocessor For example, some models of the Spectra radio, manufactured by Motorola, Inc., do not include any internal adjustable components such as potentiometers or coils. Instead, all RF and signaling parameters are controlled by an on-board microprocessor. These increasingly sophisticated radios have given rise to a concurrent need for a similarly sophisticated means of both initially programming such radios for intended service, and of servicing or reprogramming the radio in a service shop.

At the same time, however, certain radio functions are not properly controlled at the service shop or user level. For example, certain parameters that relate to the operation of trunked radios are best maintained and controlled from a single central site. Since this central site will usually maintain such information for a number of systems, the central site will likely be remote with respect to the radio that requires servicing. In the past, therefore, when system configuration changes were required, the entire code plug contents for the radio were down-loaded via modem from the central site and then programmed into the radio.

The above process presents a number of problems. For example, this approach requires the central site to maintain many parameters that are not critical to the system. This can become a significant burden. Also, as the number of parameters stored in the radio's memory increases, the telephone line connect time required to down-load each new configuration increases as well. This represents both a time and cost issue. Further, as radios become more complex (as described above), many of the radio's parameters are not available to the central site, thereby rendering the prior art approach inapplicable.

A need therefore exists for a radio programming device that can access a remote database for system critical information, and integrate that information into a radio in conjunction with other on-site programmable information.

SUMMARY OF THE INVENTION

These and other needs are substantially met through provision of the radio programming device disclosed herein.

This device is intended for use with two-way radios that have a memory for storing at least some radio control parameters, and an internal computer for controlling at least some radio control functions as a function of the stored parameters.

The device includes an appropriate coupling mechanism to allow access to at least the memory in the radio, and a programming station for communicating with the radio via the coupling mechanism. The programming station allows an operator to access the memory and read the radio control parameters that are stored therein, to change these radio control parameters, and to store the changed and unchanged radio control parameters in the radio's memory, such that future use of the radio will be governed by the newly stored parameters.

In another embodiment of the invention, the programming station can also read, change, and store certain radio feature parameters that may also be stored in the memory of the radio.

In yet another embodiment, the programming station can receive new radio feature parameters that are maintained at a remote central unit, and combine that new information with other radio control and radio feature parameters in an integrated form, and store the composite information in the memory of the radio.

BEST MODE FOR CARRYING OUT THE INVENTION

Figure 1:
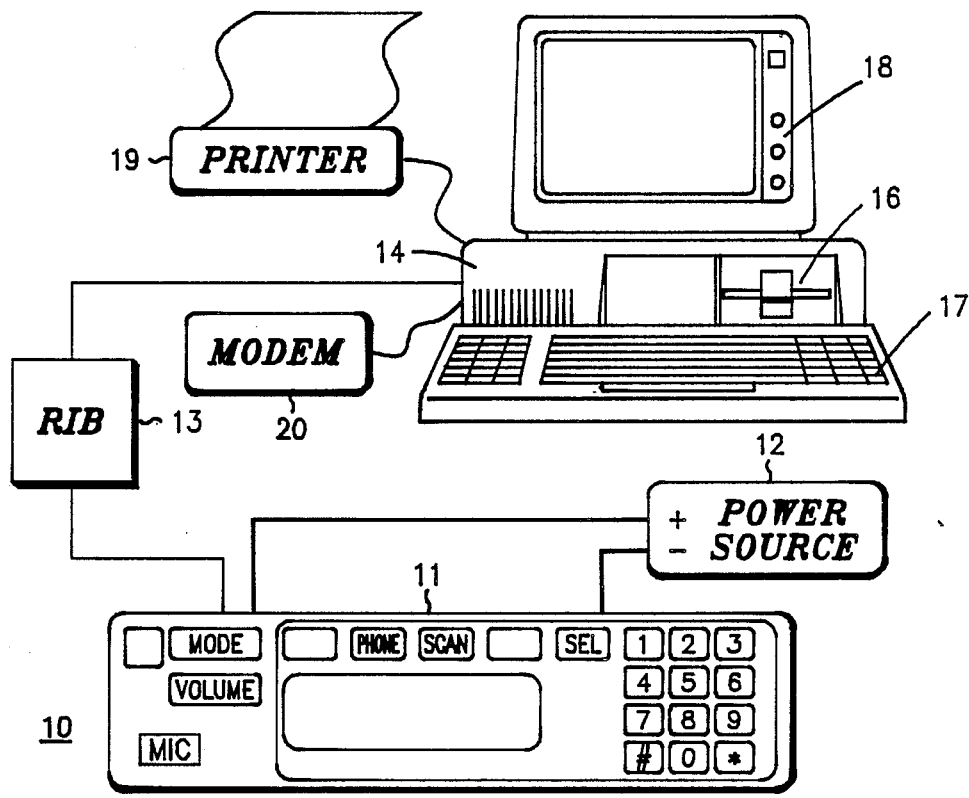
FIG. 1 comprises a block diagram depiction of the invention as coupled to a two-way radio.

Referring now to FIG. 1, the programming station, depicted generally by the numeral 10, operates in conjunction with an appropriate two-way radio (11). The radio (11) connects to an appropriate power source (12) and the programming station (10) couples to the radio (11) through an appropriate coupling mechanism; in this case, a radio interface box (13). Each of these components will now be described in more detail in seriatim fashion.

The radio (11) may be, for example, a Spectra two-way land mobile radio as manufactured and sold by Motorola, Inc. Such a radio has an internal microprocessor for controlling its radio control functions and its radio feature functions. (As used herein, "radio control functions" refers to radio specific performance parameters, such as deviation, reference oscillator, transmit power, signaling deviation, and so forth. "Radio feature functions" refers to both user specific and system specific features, such as trunking system data, IDs, channel scan lists, telephone interconnect data, call number lists, and so forth.)

The microprocessor in the radio communicates with other devices within the radio and external to the radio on a serial bus. The radio interface box (13) functions to level shift the RS232 voltage level signals that are output and received by the programming station (10) to an appropriate signal level that is compatible with the radio's serial bus interface.

The radio interface box (13) may be provided through use of Part No. 01-80353A74. The cable between the radio interface box (13) and the radio (11) may be provided through use of Part No. 30-80369B73. The cable between the radio interface box (13) and the programming station (10) may be provided through use of a Part No. 30-80369B71. All Of the above noted parts are manufactured and sold by Motorola, Inc.

The programming station (10) can be comprised of an IBM personal computer or compatible (14), which includes at least one RS232 port, 512K RAM, and a DOS 3.0 operating system. In addition, at least one disk drive (16), a keyboard (17), a display screen for displaying alphanumeric information (18), a printer (19), and a modem (20) should be provided.

Figure 2:
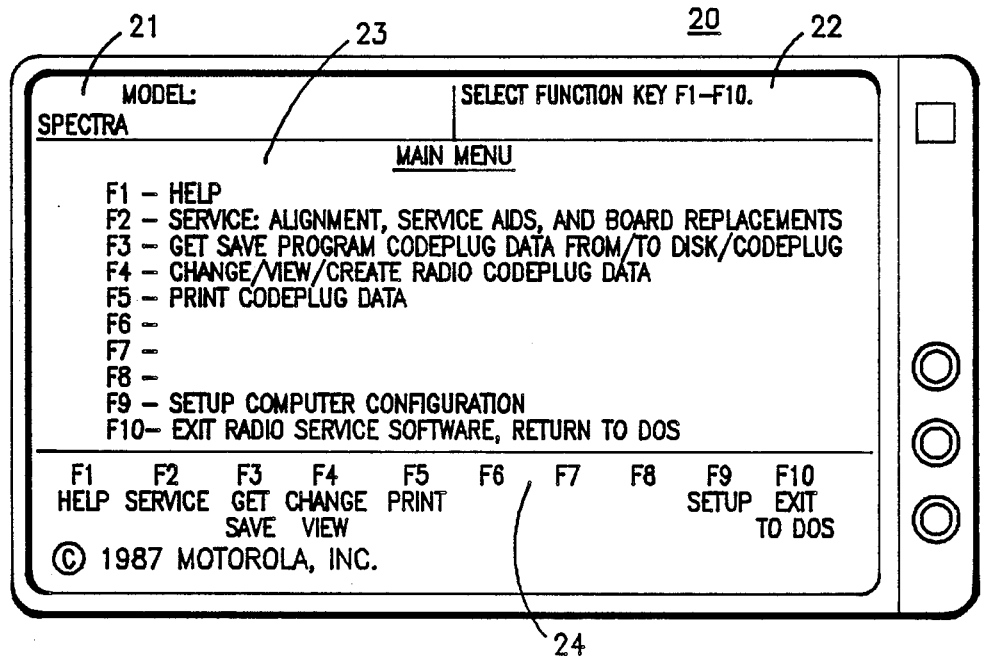
FIG. 2 comprises a depiction of a main menu as presented at the programming station.

Referring now to FIG. 2, most actions of the programming station (10) are controlled through the use of formatted screen displays and the function keys ordinarily found on the keyboard (17) (i.e., F1–F10). In general, all screens provided at the programming station (10) use an identical format, with the screen being divided into four dedicated sections. The first dedicated section comprises a box (21) in the upper left hand corner. This box (21) displays the radio's trademark (in this case, "Spectra"), along with the model number (or other radio type indicia) of the radio as read from the radio's memory (the model number is not displayed in FIG. 2 but can be seen in FIG. 4).

The second dedicated section comprises a box in the upper right hand corner (22) that displays an indication of a generic type of input that the programming station (10) expects at that time from the user. For example, as depicted in FIG. 2, the words "Select Function Key F1–F10" instruct the operator that one of the indicated function keys must be actuated to select a desired operation. Also, error messages and data entry errors are displayed in this box (22) when necessary.

The third dedicated section comprises a large center box (23) that contains menu descriptions or data entry fields, depending upon the function currently in progress. FIG. 2 displays the main menu in this section. The main menu indicates the other functions that can be accessed through use of the function keys.

Finally, the fourth dedicated section comprises an area at the bottom (24) of the display screen. This section (24) provides an abbreviated indication of each function key operation. In general, the location of the display indicia coincides with the general location of the function keys themselves as an additional aid to the operator.

Figure 3:
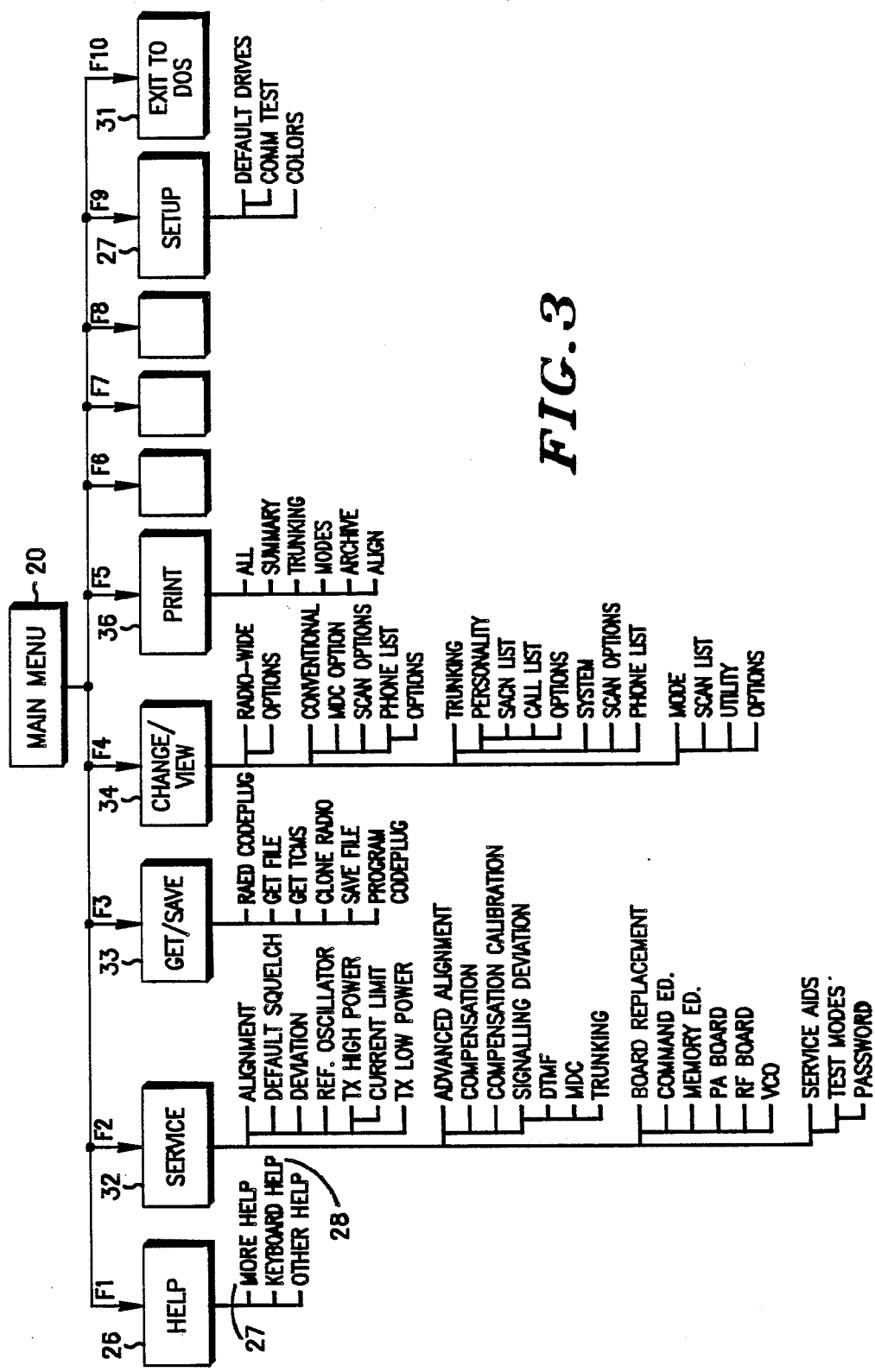
FIG. 3 comprises a diagrammatic representation of the functional capabilities of the programming station.

With reference to FIG. 3, the programming station (10) provides screens and functions organized as depicted The system will not allow an operator to randomly jump from one screen or function to another. Instead, the operator must move up and down the branches by using the menu screens and function keys in an appropriate manner. For example, pushing the F1 function key will provide a help function (26) which in turn leads to various other help options, including "more help" (27) and "keyboard help" (28). The help options provide helpful supplemental information regarding the operation of the programming station (10) to the user.

In addition to the help function (26), the main menu (20) provides access to an initial setup function (29) and an exit routine (31). The main menu (20) also allows access to four important service and programming menus: service (32), get/save (33), change/view (34), and print (36). (Additional information regarding the service function (32), the get/save (33) function and the print function (36) can be found in copending U.S. patent application Ser. No. 07/175,361 filed on Mar. 30, 1988 and entitled Radio Component Replacement/Programming Device, Ser. No. 07/175003 filed on Mar. 30, 1988 and entitled Radio Alignment/Programming Device, and Ser. No. 07/175,084 filed on Mar. 30, 1988 and entitled Radio Programming Device, which applications are incorporated herein by this reference.)

In general, the service function (32) comprises a multilevel menu routine that supports radio alignment, advanced alignment, board replacement, and service aids functions. All service screens access the memory in the radio directly, and it is not necessary to read the radio's memory via the get/save function (33) before using the service screens. All service screens use the same four dedicated screen sections described earlier.

The get/save function (33) generally functions to read radio control and radio feature parameters as stored in a radio's memory, and to obtain achieved parameter information from a diskette or hard disk. However obtained, the change/view function (34) can then be used to edit the parameter information. The get/save function (33) also operates to write modified parameter information into the radio's memory, or to save the modified parameters to an archive file on a diskette or hard disk.

Finally, the print function (36) allows production of permanent records of parameter configurations.

Figure 4:
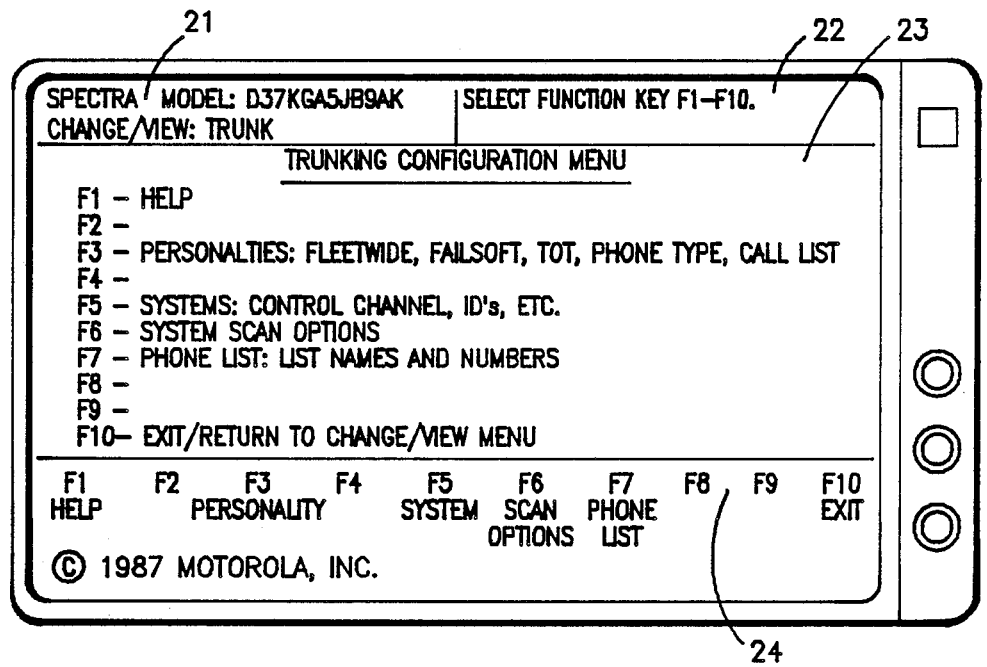
FIG. 4 comprises the trunking configuration menu as presented at station.
Figure 5:
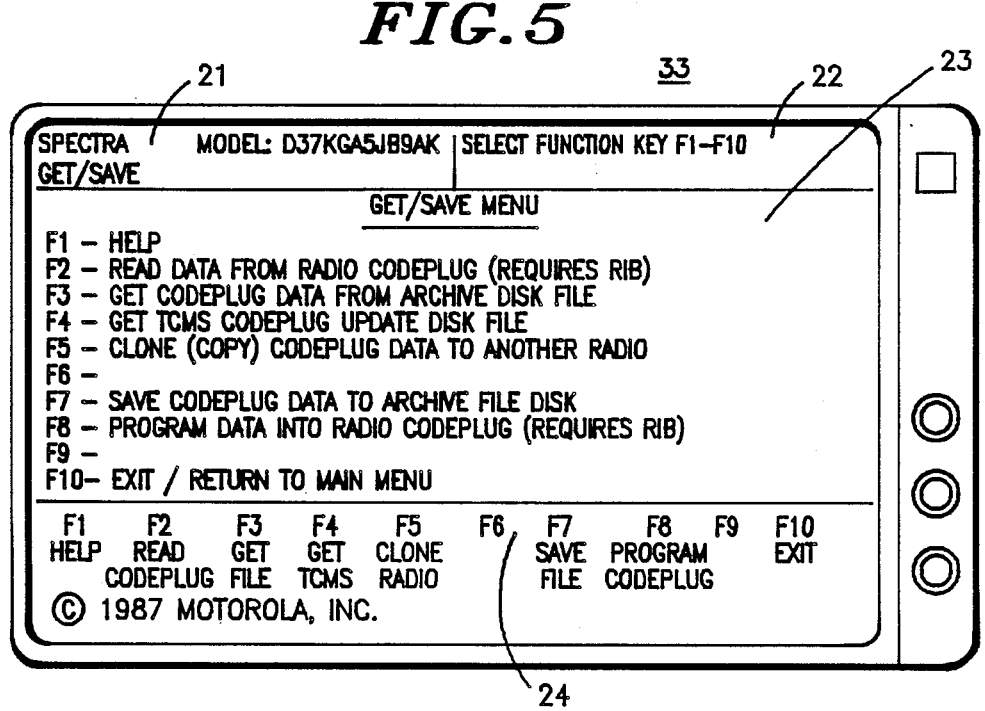
FIG. 5 comprises the get/save menu screen as presented at the programming station.

With reference to FIG. 4, the trunking configuration menu as depicted therein can be obtained by selecting the appropriate function key from the change/view menu (34). The trunking configuration menu allows the user to view and/or change parameters that relate to radio feature functions, such as trunking personality and system parameters.

Many personality and system parameters can only be changed through access to a remote central unit, such as a trunking code management system (TCMS). Other parameters can be changed on-site directly from the programming station (10). For example, with reference to Table 1 set forth below, various parameters that relate to personality, personality options, system, system scan options, and phone menu are represented in conjunction with a code. This code indicates whether the parameter can be viewed-only by the programming station (10) unless access is made to the remote central unit ("V"), or whether the parameter can be both viewed and changed with access only to the programming station (10) ("C").

TABLE 1

| PERSONALITY | | SYSTEM | |
|---|---|---|---|
| Failsoft | V | Connect Tone | V |
| Phone Enable | C | Control Channel | V |
| Private Call Enable | C | Individual ID | V |
| Private Call List | C | System ID | V |
| System # | V | | |
| System Scan Enable | C | SYSTEM SCAN OPTIONS | |
| System Scan List | C | Cntrl Channel Monitor | C |
| Time Out Timer | C | Failsoft Monitor | C |
| User Group ID | V | Nuisance Delete Enable | C |
| | | Rx Hang Time | C |
| PERSONALITY OPTIONS | | Tx Hang Time | C |
| ISW Retry Timer | C | | |

TABLE 1-continued

| Talk Back Scan Enable | C | PHONE MENU |   |
|---|---|---|---|
| Talk Permit Tone | C | Phone List Names | C |
| Trunking Type | V | Phone Numbers | C |

From the depicted trunking configuration menu, the F3 function key can be selected to view and change radio feature parameters such as personality and personality options as listed in Table 1. Selection of the F5 function key allows system options to be viewed only. Changes to these system options requires accessing the remote central unit, and that procedure will be described below in more detail. The F6 function key allows the user to both view and change system scan options, thereby allowing the user to easily customize these radio feature parameters. Finally, selection of the F7 function key allows the user to view and change phone list parameters. This allows the user to enter preprogrammed telephone interconnect numbers and names that are associated with each number in the list.

As indicated above, not all radio feature parameters can be changed on-site with access only to the programming station (10). Many of these parameters, particularly the ones relevant to operation and behavior of the radio within a system context, should only be changed with the permission of a remote central unit that has responsibility for the programming of similar parameters for all radios operating within the system. Therefore, to change these parameters, the remote central unit must be accessed Through use of the programming station (10), appropriate software (such as the on-line field programming software sold by Motorola, Inc. as Part No. RVN4004A), and the modem (20) associated therewith, the remote central unit can be accessed in a normal and usual manner. An indication of the desired radio feature parameter changes can then be provided to the remote central unit. Importantly, it is not necessary to inform the remote central unit of all proposed parameter changes; only those parameters that should only be changed with permission of the remote central unit need be provided in this way.

The remote central unit can then approve the changes by down-loading an appropriate file to the programming station (10), which file includes the new radio feature parameter information. Again, this new information need not include all radio control and radio feature parameters. Instead, only those parameters that should only be changed through access to the remote central unit need be down-loaded.

The get/save function (33) can then be used to either read current parameter data from the radio (through selection of the F2 function key) or to obtain parameter information as stored in an archive file (through selection of the F3 function key).

Figure 6:
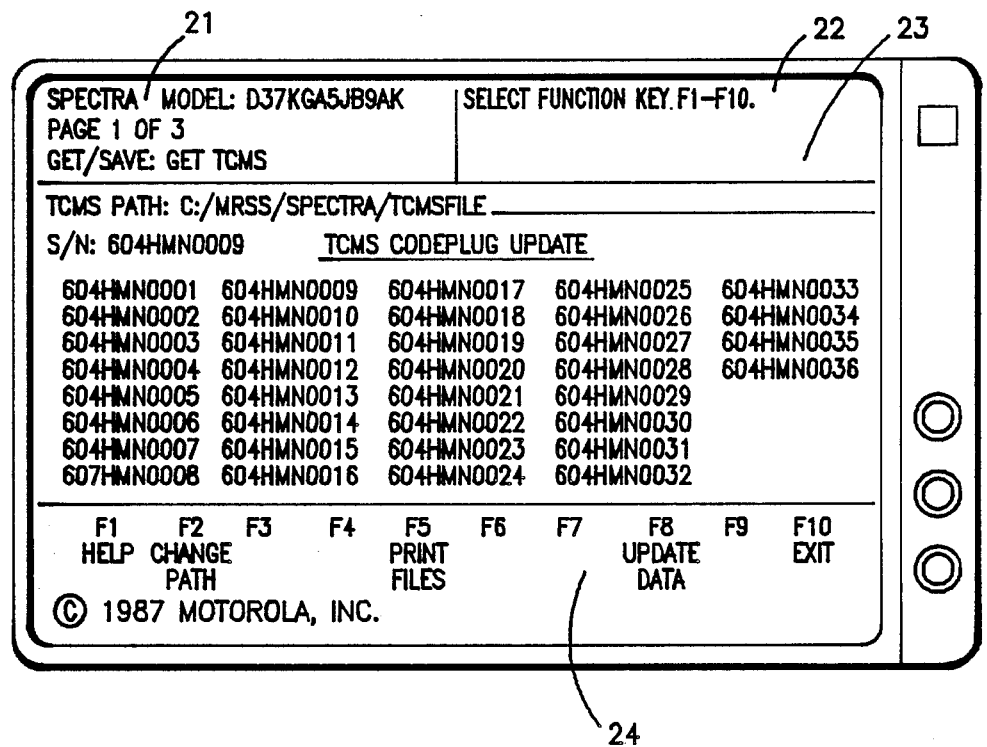
FIG. 6 comprises a representation of the TCMS code plug update screen.

Next, the user can select the F4 function key from the get/save menu to initiate the get TCMS function. The programming station (10) will then review its files to locate the above noted down-loaded file from the remote central unit, and present the relevant information on an update screen as depicted in FIG. 6. The F8 function key can then be selected from this screen to cause the updated radio feature parameter information to be merged with other parameters (which may be either changed or unchanged) and down-loaded to and stored in the radio.

In this way, radio feature parameters that are both changeable directly from the programming station (10) and those that are changeable only through access to the remote central unit can be merged and programmed into the radio with a minimum requirement for connect time to the remote central unit and a minimum burden being placed upon the remote central unit to maintain records regarding all parameters of the radio.

We claim:

1. A method for using a programming station to program a radio that operates in a communication system, which radio includes memory means for storing:
   first radio feature parameters that may be changed by said programming station without approval from a remote central unit; and
   second radio feature parameters that should only be changed with approval from said remote central
said method including the steps of:
   (A) coupling said programming station to said radio;
   (B) accessing said remote central unit to: (i) provide information to said remote central unit regarding changes to at least some of said second radio feature parameters; (ii) receiving approved changed second radio feature parameters from said remote central unit;
   (C) combining at least some of said approved changed second radio feature parameters with at least some of said first radio feature parameters to provide combined parameters;
   (D) storing said combined parameters in said memory means.

2. A method for programming a radio that operates in a communication system, which radio includes memory means for storing:
   first radio feature parameters that are substantially related to radio specific features; and
   second radio feature parameters that are substantially related to system specific features; said method including, at a programming station that is coupled to said memory means, the steps of:
   (A) reading at least some of said first and second radio feature parameters from said memory means;
   (B) accessing a remote data base that stores data relating to said second radio feature parameters;
   (C) providing information to said remote data base regarding desired changes to said second radio feature parameters;
   (D) receiving approved changed second radio feature parameters from said remote data base;
   (E) merging said approved changed second radio feature parameters with said first radio feature parameters;
   (F) storing said merged parameters in said memory means.

3. A device for programming a radio that operates in a communication system, which radio includes:
   memory means for storing:
   first radio feature parameters that are related to radio specific features; and
   second radio feature parameters that are related to system specific feat
   computer means for controlling at least some radio features in response said first and second radio feature parameters;
   said device comprising:
   (A) first coupling means for coupling to said memory means;

(B) second coupling means for coupling to a remote central unit;
(C) programming means for connecting to said first and second coupling means, for:
reading said first and second radio feature parameters in said memory means;
changing at least some of said first radio feature parameters without input from said remote central unit;
receiving new second radio feature parameters from aid remote central unit;
storing said changed first radio feature parameters second said new second radio feature parameters in said memory means.

* * * * *

UNITED STATES PATENT AND TRADEMARK OFFICE
CERTIFICATE OF CORRECTION

PATENT NO.   :   4,927,789
DATED        :   May 22, 1990
INVENTOR(S)  :   Thomas F. Shirley, Jr. et al.

It is certified that error appears in the above-identified patent and that said Letters Patent is hereby corrected as shown below:

Col. 6, line 15, after the word "central" please insert the word --unit;--.

Col. 6, line 62, "feat" should be --features;--.

Col. 6, line 64, in between the words "response" and "said" please insert the word --to--.

Col. 8, line 4, "aid" should be --said--.

Col. 8, line 6, delete the first occurrence of the word "second" and insert thereat the word --and--.

Signed and Sealed this

Thirtieth Day of July, 1991

Attest:

HARRY F. MANBECK, JR.

Attesting Officer

Commissioner of Patents and Trademarks